Nov. 1, 1966 R. G. ANDERSON ET AL 3,283,089

ELECTRIC CONTROL DEVICE WITH AN IMPROVED MECHANISM FOR OPERATING CIRCUIT INTERRUPTING MEANS

Filed Sept. 3, 1964 5 Sheets-Sheet 1

WITNESSES:
John G. Chopp
Leon M. Garman

INVENTORS
Robert G. Anderson and
William Donald
BY
William A. Elchik
ATTORNEY

Nov. 1, 1966 R. G. ANDERSON ET AL 3,283,089

ELECTRIC CONTROL DEVICE WITH AN IMPROVED MECHANISM FOR OPERATING CIRCUIT INTERRUPTING MEANS

Filed Sept. 3, 1964 5 Sheets-Sheet 5

United States Patent Office 3,283,089
Patented Nov. 1, 1966

3,283,089

ELECTRIC CONTROL DEVICE WITH AN IMPROVED MECHANISM FOR OPERATING CIRCUIT INTERRUPTING MEANS

Robert G. Anderson, Streetsville, Ontario, and William Donald, Toronto, Ontario, Canada, assignors to Canadian Westinghouse Company, Limited, Hamilton, Ontario, Canada Filed Sept. 3, 1964, Ser. No. 394,107
25 Claims. (Cl. 200—18)

This application is a continuation-in-part of our application Serial No. 298,935, filed June 31, 1963, now abandoned.

The present invention relates to operating mechanisms for circuit breakers and has particular application in conjunction with an electrical system and a pair of circuit breakers to function as a transfer switch. This invention also has particular utility in the art of motor controlled circuit interrupters.

Transfer switches are used in situations where a load must be transferred from a normal supply to an emergency supply upon failure of the normal supply. They should also provide for the return of the load to the normal supply on its recommencement.

Previous transfer switches have been arranged to provide these functions but in general their design has been based upon the use of solenoids to operate the circuit breakers. Solenoids have an extremely rapid acceleration unless specially designed. As a result they expose the breaker mechanism to excessive accelerations and shocks. Transfer switches using solenoids therefore are usually designed around the solenoids and utilize special circuit interrupting mechanisms which will withstand the shock of solenoid operation. It is not generally satisfactory to use standard circuit breakers in such a transfer switch because of the shocks to which they are exposed. With solenoid operation it is also necessary to provide a mechanical interlock between the circuit interrupting mechanisms. Since the solenoids are individual and separate items and each is associated with its own electrical system, it is evident that the mechanical interlock is an attempt to produce a mechanical correlation between two separate electrical systems. Failure of either of the electrical systems will give rise to forces causing great strains on the mechanical interlock and necessitating extremely rugged design for the mechanical portion.

It is therefore an object of this invention to provide an improved form of transfer mechanism.

It is a further object of this invention to provide a transfer mechanism which does not permit the simultaneous connection of both standby and normal supply to load circuits but inherently prevents such operation.

It is a further object of this invention to provide a transfer switch which does permit the simultaneous exclusion of both sources of supply from the load.

It is a further object of this invention to provide a transfer switch which has a relatively uniform acceleration pattern and a gradually increasing velocity character, thus freeing the circuit interrupting means from shock during operation.

These and other objects are attained by providing a unidirectional driving motor for operating the circuit breakers in accordance with electrical signals and controls as provided and cam means for converting the rotary motion of the driving motor to a linear reciprocating motion, whereby the operators of the circuit breakers are positively driven in mutually opposite directions at the same time.

It is further provided that the driving force for the mechanical portion of the system may alternatively be provided manually without energization of the driving motor.

Another object of this invention is to provide an improved motor and manually operable mechanism for operating circuit interrupters which mechanism is so constructed that the handle structure is operable independently of the motor mechanism to effect operation of the circuit interrupters.

Another object of this invention is to provide an improved motor and manually operable mechanism for operating circuit interrupters which mechanism is so constructed that the motor will operate independently of the handle structure to effect operation of the circuit interrupters.

A further object of this invention is to provide an improved motor and manually operable mechanism for operating circuit interrupters which mechanism is so constructed that the motor will operate independently of the handle structure to effect operation of the circuit interrupters and which mechanism is so constructed that the handle structure is operable independently of the motor to effect operation of the circuit interrupters.

A more general object of this invention is to provide an improved mechanism for operating circuit interrupters.

A clearer understanding of our invention may be had from the following specification and drawings in which.

Figure 1:
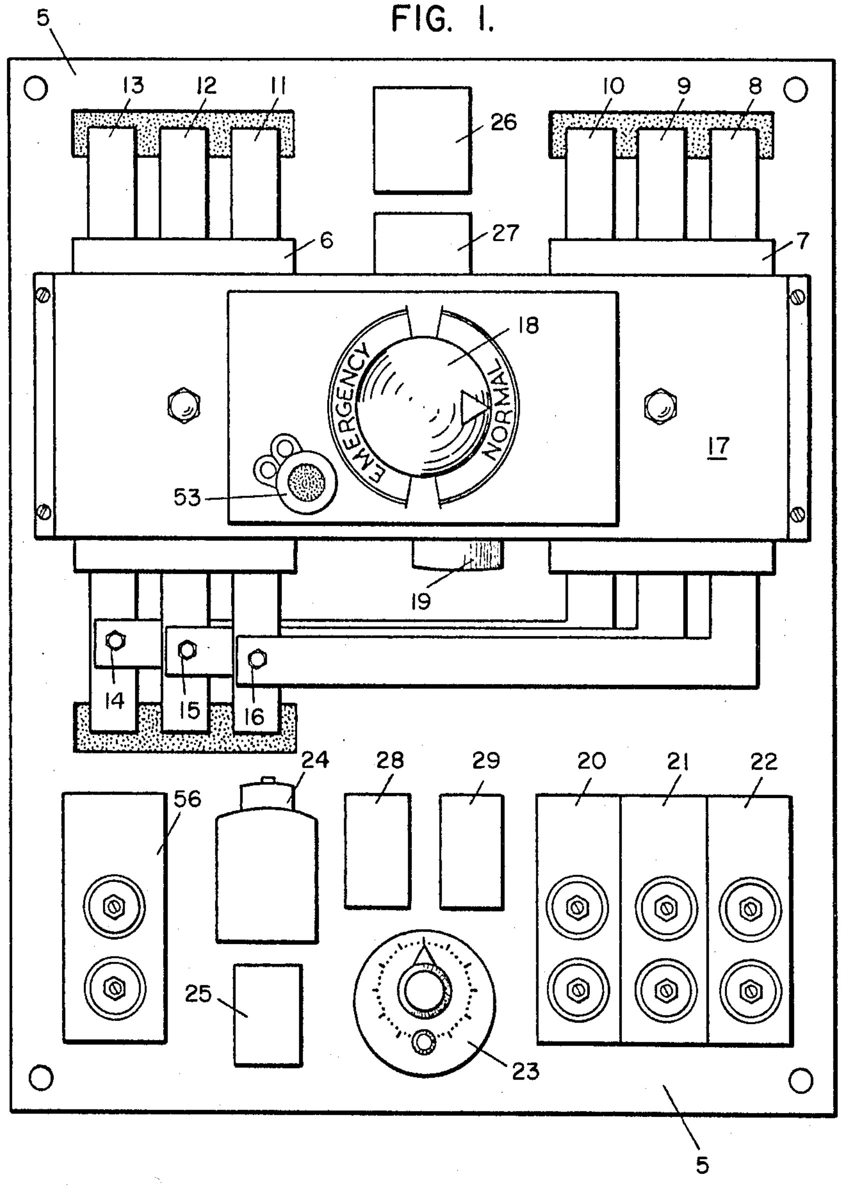
FIGURE 1 is a plan view of the whole transfer switch assembly.

Considering first FIGURE 1, there is shown a base plate 5 on which is mounted a pair of circuit breakers 6 and 7 which are connected to a normal supply and an emergency supply through busses 8, 9, 10, 11, 12 and 13 respectively. The other terminals of both the circuit breakers 6 and 7 are connected to a 3-wire output bus and from thence connected to a load (not shown) through terminals 14, 15 and 16. A U-shaped sub-chassis 17 carries the mechanical portion of the transfer switch and is rigidly mounted on the base plate 5. A handle 18 protrudes through the sub-chassis and a drive motor 19 is supported from a bracket on the sub-chassis. Various electrical components are mounted on the base plate 5 such as voltage sensitive relays 20, 21 and 22, timer switch 23, timer switch 24, transformers 25, 26 and 27, relays 28 and 29, and a frequency sensitive relay 56.

Figures 2A, 2B:
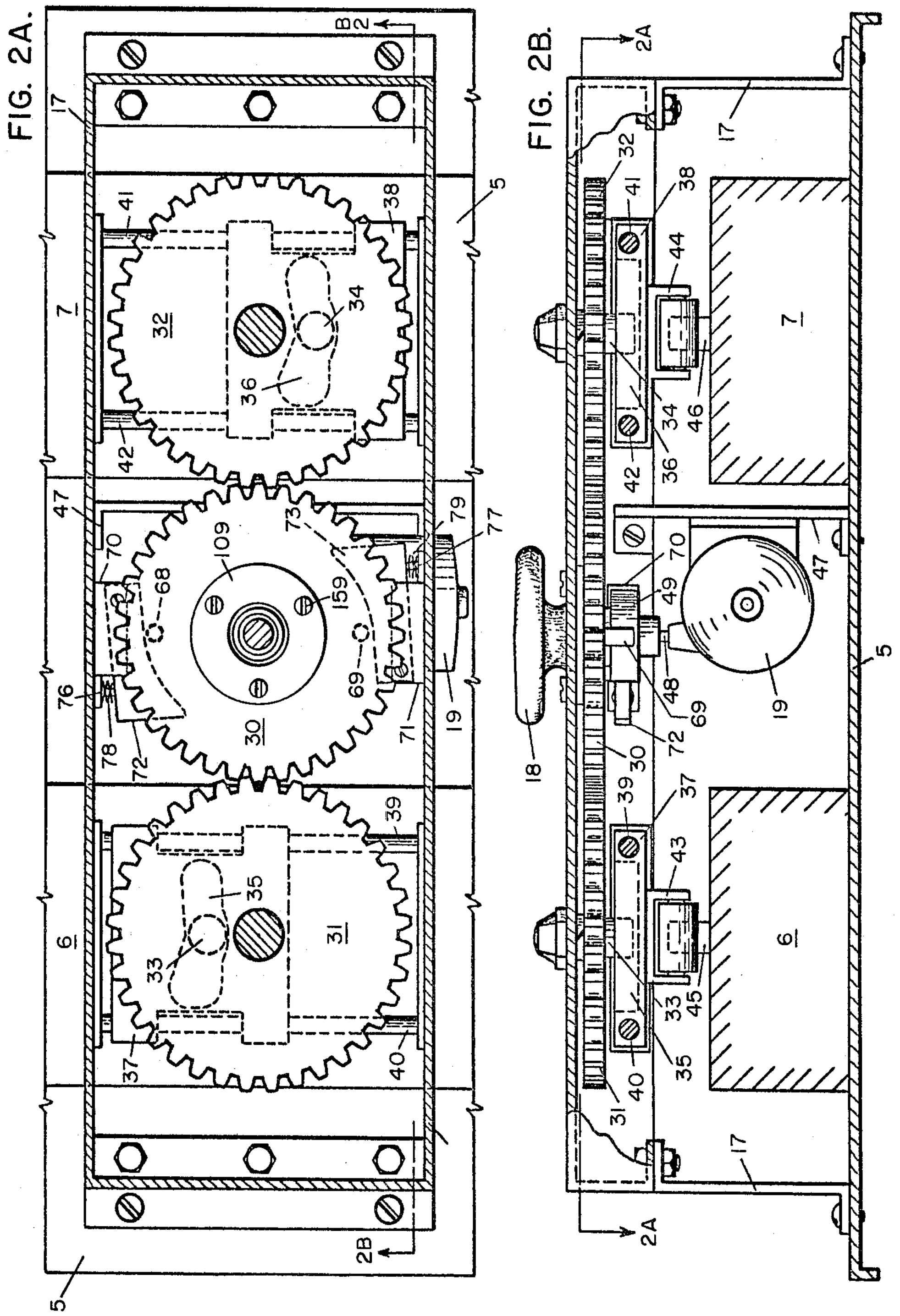
FIG. 2A is a detailed drawing in section of the mechanical portion of this switch.
FIG. 2B is a detail drawing of the apparatus of FIGURE 2A at section 2B—2B.

Considering now FIGURE 2A there is shown a plan view of the mechanical portion of the transfer switch including the sub-chassis 17, portions of breakers 6 and 7, drive motor 19 and a portion of the baseplate 5.

Pivotally mounted on the sub-chassis 17 are three spur gears 30, 31 and 32. The rotatable operator or gear 30 is driven by motor 19 through a worm reduction gearing and a unidirectional clutch. Mounted on the spur gear 30 but not shown in FIGURE 2A is an operating handle 18. Gears 31 and 32 engage gear 30 and are driven thereby. Cam followers 33 and 34 are mounted on the gears 31 and 32 and engage camming surfaces 35 and 36 respectively in the slides 37 and 38. These slides are mounted on rods 39, 40, 41 and 42 which in turn are rigidly fixed in sub-chassis 17. Fixed to the lower surface of the slides 37 and 38 are roller assemblies 43 and 44 shown in FIGURE 2B which comprise a pair of resilient rollers mounted in U-shaped frames arranged to bear on each side of the handles of circuit breakers 6 and 7.

In FIGURE 2B there can be seen handle 18 mounted on gear 30 which engages gears 31 and 32 which drive cam followers 33 and 34 which in turn actuate the slides 37 and 38 moving roller assemblies 43 and 44 which actuate the operating members or handles 45 and 46 of breakers 6 and 7. The drive motor 19 is shown mounted on a bracket 47 which is supported on sub-chassis 17 and bolted to the base plate 5. The reduction gearing is coupled through shaft 48 and unidirectional clutch 49 to gear 30.

*Mechanical operation*

When the motor 19 is energized, shaft 48 is rotated in a counterclockwise direction driving gear 30 through clutch 49. Gear 31 is therefore driven in a clockwise direction and cam follower 33 slides along the camming surface 35 causing slide 37 to move downward from the position shown on the drawing. At the same time gear 32 moves in a clockwise direction and cam follower 34 slides along camming surface 36 causing slide 38 to move upwards. The motion of slides 37 and 38 is almost simultaneous and is reverse direction. Therefore the handles of breakers 6 and 7 are moved in opposite directions causing one breaker to be switched on and the other to be switched off. The formation of the camming surface is arranged to prohibit the simultaneous closure of both breakers. In the position shown it is obvious that slide 37 will start to move before slide 38 even though gears 31 and 32 start to rotate simultaneously. Since breaker 7 is now open and is moving into the closed position, it will not close until breaker 6 which is moving into the open positions opens. There will therefore be an instantaneous condition when both breakers are open. Use may be made of this situation as will be pointed out later. After gears 31 and 32 have rotated 180 degrees, breaker 7 which was open is now closed and breaker 6 which was closed is now open. If motor 19 continues to rotate, the same operation continues with slide 38 being moved in a downward direction preceding the motion of slide 37 and causing breaker 7 to open before breaker 6 closes. After 180 further degrees, a total of 360 degrees, breakers are re-established in their original condition with breaker 6 closed and breaker 7 open.

It will be noted that due to the formation of the camming surface the closed breaker is always set in motion before the open breaker thus ensuring as previously has been stated that both breakers are never closed simultaneously.

The presence of the one-way clutch 49 permits manual operation of the transfer switch without driving the motor 19. The handle 18 is rotated in a counterclockwise direction until a pointer on the handle indicates the desired condition. It may for example be moved from normal to emergency operation by 180 degree rotation or it may be moved to an intermediate position where both breakers are open, thus providing isolation of the load from both sources. Suitable markings are placed on the face of the sub-chassis 17 to indicate the condition of the transfer switch in accordance with the position of the operating handle.

*Electrical system*

Figure 3A:
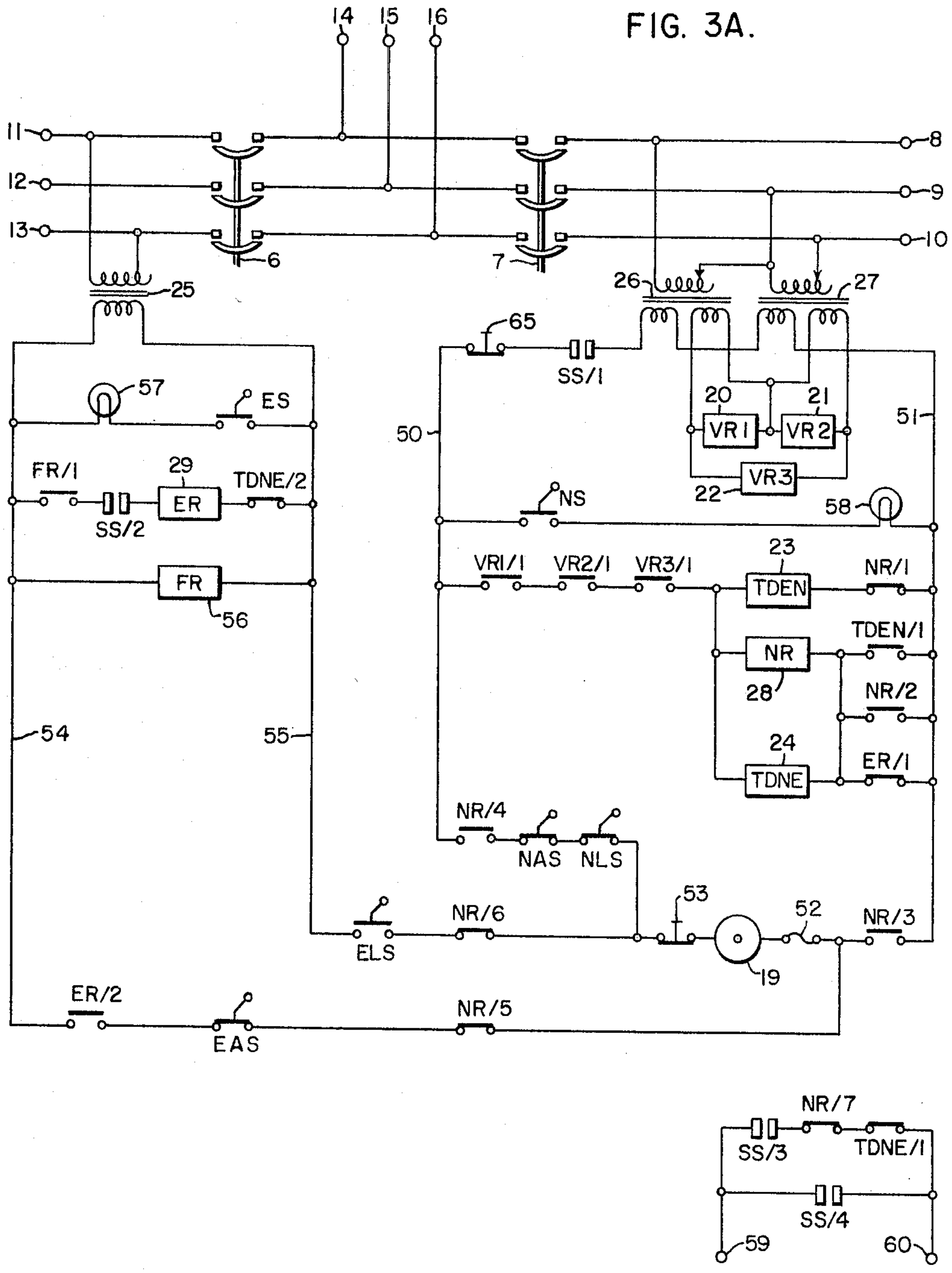
FIG. 3A is a schematic diagram of the control portion of the switch.
Figure 3B:
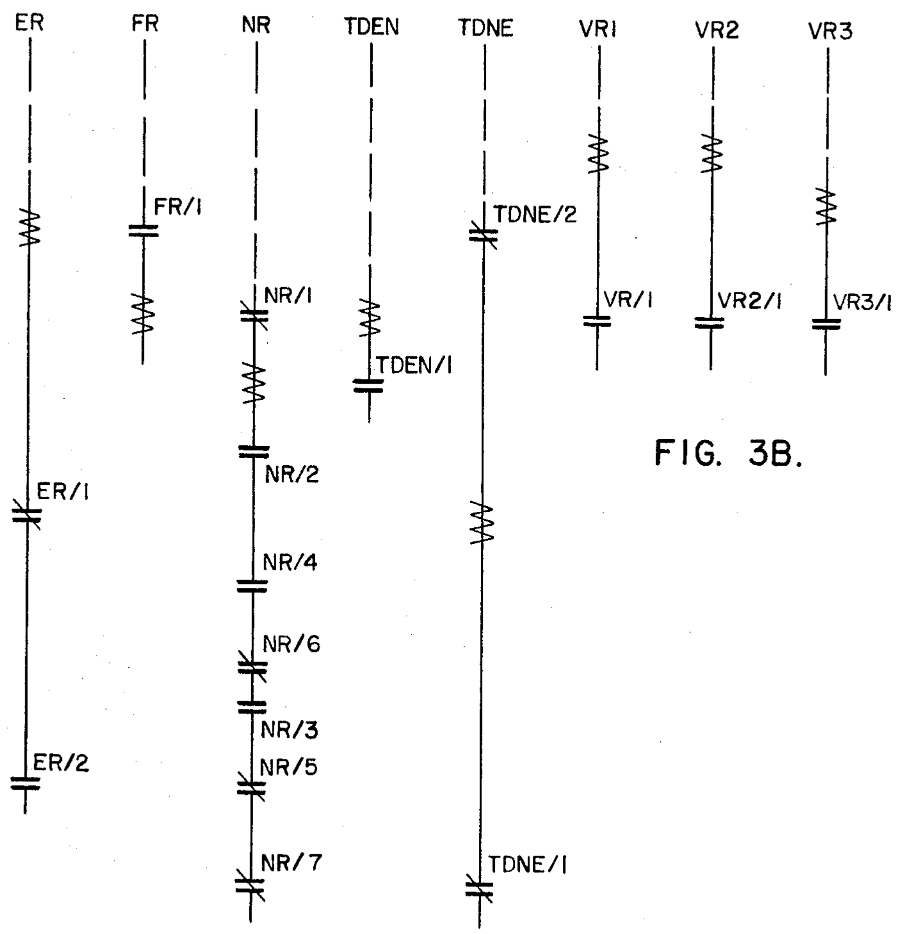
FIG. 3B is a key sheet for FIGURE 3 showing the relationship of various relays and contacts.

Let us now consider the electrical system which is illustrated in FIGURE 3A together with the key diagram 3B. In FIGURES 3A and 3B the relay designations are given as letters for example NR, VR1 etc., while their associated contacts are given as NR/1, VR/1 etc. It will be understood that NR/7 for example is contact seven of relay NR. The mechanical correlation of contacts and relays is shown in FIGURE 3B which enables the contacts of any relay to be quickly located by examining FIGURE 3B, finding the contact and relaying across to FIGURE 3A to find the location of the contact in the circuit.

In FIGURE 3A there are shown a series of normal supply terminals 8, 9 and 10 and emergency supply terminals 11, 12 and 13, both of which are connectable through circuit breakers 6 and 7 to the load terminals 14, 15 and 16. Connected across the normal supply terminals 8, 9 and 10, are a pair of transformers 26 and 27. The secondaries of these transformers are connected in series to conductors 50 and 51. The tertiaries of these transformers are utilized to energize relay coils 20, 21 and 22 of voltage sensitive relays designated VR1, VR2 and VR3. The contacts of these voltage sensitive relays designated VR1/1, VR2/1 and VR3/1 are arranged in series from conductor 50, to the coil 23 of relay designated TDEN and through normally closed contacts NR/1 to conductor 51. A path also exists from the voltage sensitive relay contacts through the coil 28 of relay NR and also the coil 24 of relay TDNE through normally closed contacts ER/1 to conductor 51.

Contacts NR/2 which are normally open and TDEN/1 which are normally open are in parallel with contacts ER/1 which are normally closed.

Motor 19 is supplied from conductors 50 and 51 through contacts NR/3 and fuse 52 through motor 19, emergency pushbutton 53, contacts NLS, NR/4, NAS to conductor 50. Pushbutton 53 is normally closed but may be locked open. Similarly test pushbutton 65 which connects conductor 50 to the secondaries of transformers 26 and 27 is normally closed but may be pushed open.

The output from the secondary of transformer 25 is applied to conductors 54 and 55 and may be used alternatively to the supply motor 19. Under these circumstances the circuit for motor 19 is as follows:

Conductor 54, contact ER/2, NR/5, EAS, fuse 52, motor 19, pushbutton 53, ELS, NR/6 to conductor 55.

Also connected between conductors 54 and 55 are the coil 56 of the frequency sensitive relay FR and the coil 29 of relay ER, the latter coil being in series with the contacts FR/1 of relay FR, contacts SS/2 of the selector switch and contacts TDNE/2 of relay TDNE, the time delay normal to emergency relay. Also across conductors 54 and 55 is a signal light 57 in series with contacts ES and across conductors 50 and 51, a signal light 58 in series with contacts NS. Further contacts for controlling the operation of the diesel auxiliary generator are shown at the lower portion of this circuit diagram and include contacts SS/4 and in parallel therewith contacts SS/3, NR/7, TDNE/1 in series. In order that the diesel shall start, it is necessary that one of these arrangements provide a continuous circuit between terminals 59 and 60.

*Operation of the electrical system*

The schematic diagram is shown under conditions with no normal or emergency supply available, with both breakers open and all relays deenergized.

Let us now assume that power is being supplied on the normal terminals 8, 9 and 10. Relays VR1, VR2 and VR3 are energized. Contacts VR1/1, VR2/1, VR3/1 close. Contact ER/1 was closed energizing NR. NR/1 opens and TDEN is not energized. Contacts NR/3 and NR/4 close, NLS is closed because circuit breaker 7 is open. NAS is closed if breaker 7 is not tripped. Assuming contacts SS–1 of the selector switch are closed and pushbutton TPS is closed, the circuit is complete. If emergency pushbutton 53 has not been operated, motor 19 is energized and starts to rotate. As it rotates, it operates breaker 7 and it continues to rotate until breaker 7 is closed, opening contact NLS. Contact NR/7 is of course open and therefore the diesel start circuit is not operating.

Let us now assume that the normal supply fails. If any one of the terminals 8, 9 or 10 does not provide the suitable voltage, then relay VR1, VR2 or VR3 opens. The voltage at which these relays open is dependent upon their adjustment and may be adjusted to any desired voltage level. When one of the contacts VR1/1, VR2/1, VR3/1 opens, relay NR is deenergized. Contact NR/7 closes and the diesel start circuit is completed when relay TDNE times out and closes contacts TDNE/1. Voltage will then appear on terminals 11, 12 and 13. This supplies a voltage to transformer 25 which in turn provides a suitable voltage to conductors 54 and 55. Relay FR is a frequency sensitive relay and closes when the frequency supplied by conductors 54 and 55 reaches the desired frequency. When relay FR picks up contacts, FR/1 close and assuming contacts SS/2 to be closed, and contacts TDNE/2 to be closed because relay TDNE has timed out, the coil 29 of relay FR is energized. Contact NR/6 is closed because relay NR has been deenergized, contact ELS is closed because circuit breaker 6 is open, pushbutton 53 is not operated, contact ER/2 is closed because relay ER has been energized, contact NR/5 is closed because relay NR is deenergized, contact EAS is closed assuming breaker 6 has not been tripped by an overload. Therefore the circuit for motor 19 is complete through NR/6, ELS, pushbutton 53, motor 19, EAS, NR/5, ER/2 causing the motor to rotate until breaker 7 opens and breaker 6 closes causing contact ELS to open and deenergize the motor.

If now a normal supply reappears on terminals 8, 9 and 10, relays VR1, VR2 and VR3 will re-energize closing contact VR1/1, VR2/1 and VR3/1. Relay TDEN will be energized through contact VR2/1, VR3/1 and VR1/1 and contact NR/1 since relay NR is not energized. This latter relay is not energized because contacts NR/2, ER/1 and TDEN/1 are not closed. NR/2 is open because NR is not energized, ER/1 is open because relay ER is still energized from the emergency source and TDEN/1 is open because the relay TDEN is timing out. After a specified length of time determined by the setting of the time delay of relay TDEN, contact TDEN/1 closes energizing the relay NR and relay TDNE. The energization of relay NR causes contact NR/5 and NR/6 to open but closes contacts NR/3 and NR/4. Since breaker 7 is open, contact NLS is closed and motor 19 is energized until such time as breaker 7 is closed, opening contact NLS. With the closing of breaker 7 breaker 6 is open. The opening of contacts NR–6 and NR–5 prohibit further operation of the motor from conductors 54 and 55. At the same time that relay NR is energized relay TDNE is energized through contacts NR/2. Contacts NR/2 lock in relay NR. The opening of contacts TDNE/1 and contacts NR/7 due to energization of these relays ensures that the diesel circuit is open and the diesel is shut down. The picking up of relay TDNE open circuits the coil energization circuit of relay ER and deenergizes this relay. The energization of relay NR also opens circuit contacts NR/1 causing relay TDEN to be deenergized and reset to zero which also causes contacts TDEN/1 to open, relay NR however has been locked in by contacts NR/2. It will be noted that the indicator lights 57 and 58 are operated by sub-contacts ES and NS respectively. These contacts are on the breakers 6 and 7 and open when the breaker opens. The pilot or indicator lights therefore indicate which of the breakers is closed. The contacts SS/1, SS/2 and SS/3 and SS/4 are contacts on a selector switch which may be used to cause the transfer switch to operate through certain functions primarily for test purposes. For example closure of contacts SS/4 can be used to ensure the operation of the diesel and test its starting operation. Opening contacts SS/1 can cause the operation of the transfer switch corresponding to a failure of normal supply. Opening contacts SS/2 can cause an operation of the transfer switch corresponding to a failure of the emergency supply. Operation of contacts SS/3 can prohibit the starting of the diesel circuit even though the contacts SS/1 have indicated a failure of normal supply.

Obviously many of the special provisions in this circuit may be eliminated in a more simplified version. For example where the circuit breakers utilized do not have overload trips, there is no necessity for contacts EAS or NAS. Where there is no desire for indicator lamps, 57 and 58, there is no necessity for auxiliary switches ES and NS on the circuit breakers. Where it is not desired to delay the operation of the diesel, there is no necessity for switch TDNE and its contacts such as TDNE/1, TDNE/2, etc. Test pushbutton 65 may also not be required. Relay 56, the frequency sensitive relay, may also be eliminated if the load is not unduly affected by frequency variations. It will, however, be evident that certain relays are absolutely necessary to the system such as relays NR and ER. Relay TDEN is advisable so that unnecessary transfers will not occur and pushbutton 53 is useful to override the electrical system and permit wholly manual operation.

In the mechanical portion of the switch, braking may be provided to prevent over travel due to the inertia of the driving motors. The desirability and degree of braking required depends on course upon the nature of the load provided by the breakers. Large breakers requiring high operating forces obviously will require less braking for a given size motor than will smaller breakers. A braking system is illustrated in FIGURES 2A and 2B. Mounted on gear 30 are a pair of studs 68 and 69. A pair of brackets 70 and 71 are mounted on sub-chassis 17 on each side of and below gear 30. A pair of brake shoes 72 and 73 are pivotally supported in brackets 70 and 71. A pair of studs 76 and 77 are mounted on brackets 70 and 71 and protrude into holes in the brake shoes. Springs consisting of a plurality of cup shaped spring washers 78 and 79 are mounted on studs 76 and 77. In operation studs 68 and 69 do not engage the brake shoes until the circuit breakers have been operated. Motor 19 is then deenergized but inertia causes gear 30 to continue rotating until the studs engage the brake shoes. The energy is then dissipated and the mechanism stopped.

When the motor is again energized the studs 68 and 69 force the brake shoes back compressing the springs and gear 30 is permitted to rotate. The degree of braking required varies as indicated and may be conveniently adjusted by varying the number of spring washers used.

Figure 4:
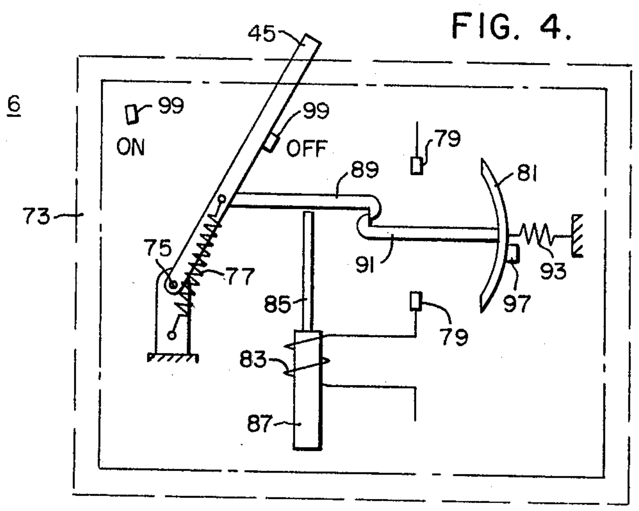
FIG. 4 is a schematic view of one of the circuit breakers seen in FIGURES 1, 2A and 2B.

The circuit breakers 6 and 7 are of identical construction. For this reason, only the circuit breaker 6 is described schematically in FIG. 4. It is to be understood that the description applies to both of the circuit breakers 6 and 7. Referring to FIG. 4, the circuit breaker 6 is of the type known in the art as a molded-case type circuit breaker since it comprises an insulating housing indicated in dot-dash and dash-dash lines at 73 in FIG. 4. The insulating housing 73 is of molded insulating material and it is provided with a suitable opening at the front portion thereof through which the external operating handle 45 extends to permit operation of the circuit breaker. The circuit breaker 6 (and also the breaker 7) may be of the type shown in the patent to E. A. Walker et al., patent No. 2,798,606. Since the circuit breaker is fully described in the above-mentioned patent, only a schematic drawing and brief description thereof is given herein. As is shown schematically in FIG. 4, the handle 45 is moved about a pivot 75 to move a spring 77 overcenter to effect opening and closing of the contacts 79, 81 in a well known manner. When the contacts 79, 81 are in the closed position and an overload current passes through the coil 83, a plunger 85 of a solenoid 87 is moved upward (FIG. 4) to pivot a latch member 89, that is pivotally supported on the handle 45, to unlatch a contact arm 91 that carries the movable contact 21, whereupon a spring 93 operates to open the contacts 79, 81. The contact 81 is stopped in the open position by means of a stop 97. The circuit breaker is reset by moving the handle 13 to the "off" position to relatch the latch member 89 with the contact arm 91. The circuit breaker is trip-free in that even if the handle 45 is held in the closed position, the circuit breaker will still be tripped open upon the occurrence of a tripping overload current through the breaker. Stop means 99 are provided to limit movement of the handle 13 in both directions.

Figures 5, 6, 7, 8:
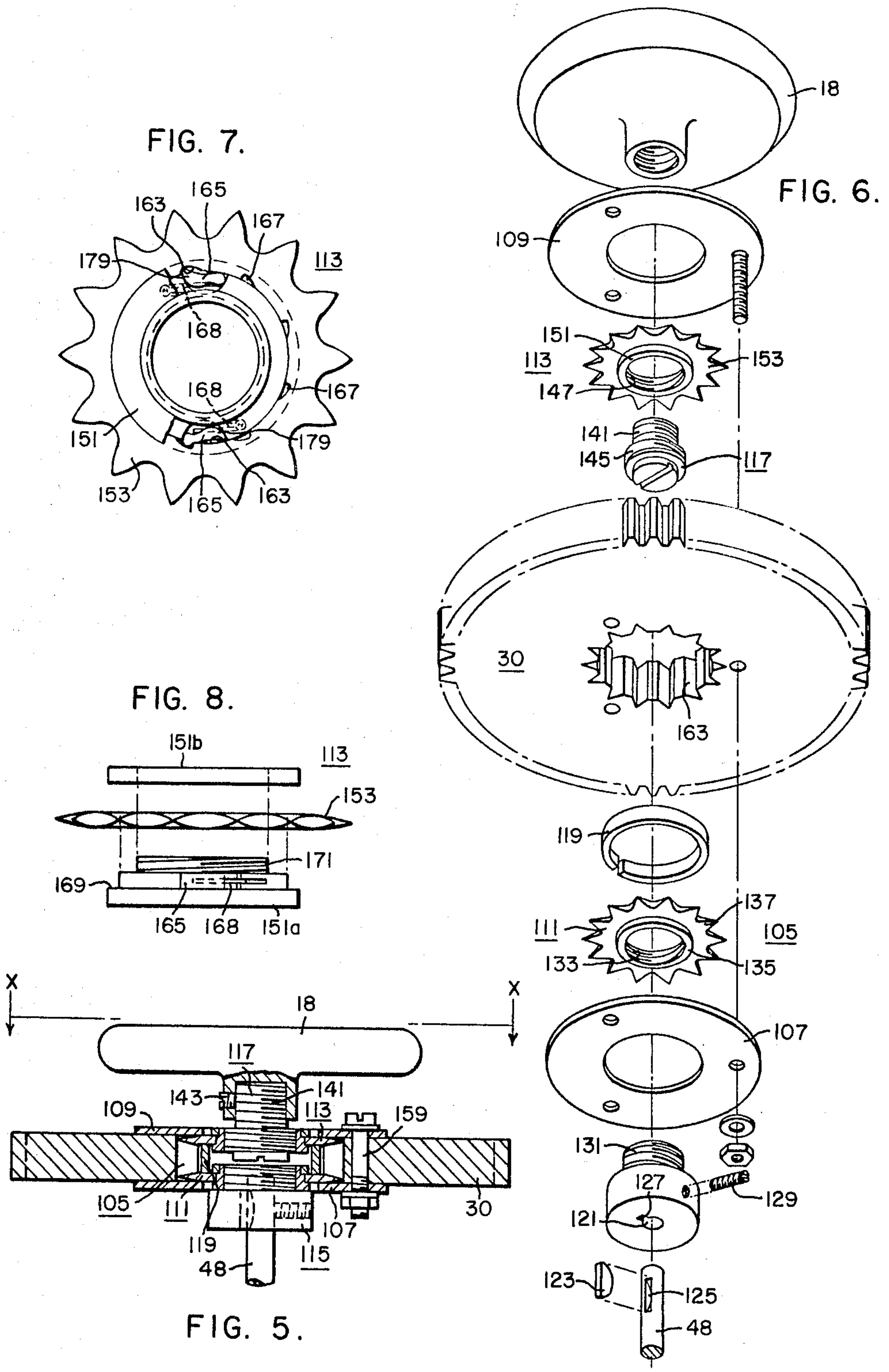
FIG. 5 is a side view, partly in section, of parts of the transfer switch seen in FIGURES 1, 2A and 2B.
FIG. 6 is an exploded isometric view of most of the parts seen in FIGURE 5.
FIG. 7 is a top plan view, with parts broken away, of one of the gear members seen in FIGURES 5 and 6.
FIG. 8 is a side elevational view of parts of a disassembled gear member of the type seen in FIG. 7.

As was previously described, the center gear 30 is operated automatically upon rotation of the shaft 48 by means of operation of the motor 19. The center gear 30 is operated manually by rotation of the manually operable handle 18. The operative connection between the shaft 48 and gear 30, and also between the handle 18 and gear 30, along with the specific description of the parts of this structure, will be most clearly understood from the following description with reference to FIGS. 5–8. Referring to FIGS. 5 and 6, it will be seen that the shaft 48 and handle 18 are operatively connected to the gear 30 by means of a connecting assembly indicated generally at 105. The connecting assembly 105 comprises two clamp plates 107 and 109, two one-way gears 111 and 113, two threaded connectors 115 and 117 and a spacer 119. The shaft 48 fits into an opening 21 in the connector 115, and a key member 123 engages in slots 125 and 127 in the shaft 48 and connector 115 respectively to key these members together for common rotation. The shaft 48, key member 123 and connector 115 are secured in position by means of a set screw 129 that is screwed through a suitable tapped opening in the connector 115 to engage the shaft 48. The upper part 131 of the connector 115 is threaded and secured to the one-way gear member 111 by being threaded into a tapped opening 133 in the member 111. As can be seen in FIG. 6, the tapped opening 133 is part of a center part 135 of the one-way gear member 111 which member also comprises an outer part 137. As can be seen in FIG. 5, the handle 18 is provided with an internal tapped opening to threadedly receive the upper threaded portion 141 of the connector 117. A set screw 143 (FIG. 5) is screwed through a suitable tapped opening in the handle structure 18 to engage the part 141 to secure the handle 18 to the connector 117. The connector 117 also comprises a lower threaded part 145 (FIG. 6) that is threaded into an internal tapped opening 147 of the one-way gear member 113 to secure the connector 117 to the gear member 113. The tapped opening 147 is part of a center part 151 of the one-way gear member 113, which gear member also comprises an outer part 153. As can be seen in FIG. 6, each of the clamp plates 107 and 109 is provided with three openings therein which openings are aligned when the clamp plates 107 and 109 that are placed on opposite sides of the gear 30 and which openings are also aligned with three openings in the gear 30. When the structure is assembled in the manner seen in FIG. 5, three bolt structures 159 are passed through the openings in the clamp plates 107 and 109 and also through the openings in the gear member 30 to secure the gear 30, shaft 48, connecting assembly 105 and handle 18 together. As can be seen in FIG. 6, the gear member 30 is provided with an opening 163 that is shaped to receive and key with the key parts of the outer parts 137 and 153 of the one-way gears 111 and 113 respectively to provide for simultaneous common rotation of the parts 137 and 153 with the gear member 30.

Since the one-way gear members 111 and 113 are of identical construction, only the gear member 113 will be specifically described herein, it being understood that the description applies to both of the one-way gear members. As was previously described, the gear member 113 comprises a center part 151 and an outer part 153. As can be seen in FIG. 8, the center part 151 comprises a lower part 151*a* and an upper part 151*b*. The lower part 151*a* has two notches therein for receiving and retaining two ratchet members 165 (FIG. 7) therein. As can be seen in FIG. 7, the members 165 rest on a shelf portion of the lower member 151*a* to be supported on the member 151*a* and the notches 163 are large enough to permit relative movement toward and away from the axis of the gear member 113. A separate torsion spring 168 is supported on the member 151*a* to bias each of the ratchet members 165 outward toward the outer circumference of the gear member 113. The outer member 153 is provided with a plurality of notches 167 around the periphery of the inner circumference thereof. During the assembly of the gear member 113, the outer part 153 is set down on a shelf portion 169 (FIG. 8) of the member 151*a* and the member 151*b* is threaded onto a tapped portion 171 (FIG. 8) of the lower member 151*a* to secure the parts of the gear member 113 together. The dimensions of the parts 153 and 151 are such that these members, which are concentric about the same axis, can rotate about the axis relative to each other. As can be seen in FIG. 7, the shape of the notches 167 on the outer member 153 and the shape of the ratchet members 165 is such that the inner part 151 can rotate in a clockwise direction while the outer member 153 is held stationary during which movement the ratchet members 165 will slip past the notches 167. If, however, the inner part 151 is rotated in a counterclockwise direction, the end portion 179 of one of the ratchet members 165 will engage in one of the slots 167 which engagement is effected by the bias of the associated spring 167 whereupon counterclockwise movement of the inner part 151 will rotate the outer part 153 therewith. As can be seen in FIG. 7, the members 165 and notches 167 are so spaced that only one of the members 165 will be moved into the driving position. A driving connection is effected when one of the parts moves only one-half of the distance between the notches 167. During counterclockwise rotation of the outer part 153, if there is any resistance to movement of the inner part 151, the slots 167 will move past the ratchet members 165 so that the outer part 153 will slip easily relative to the inner part 151 which can remain stationary. Clockwise movement, however, of the outer part 153 would drive the inner part 151 in a clockwise direction because one of the springs 167 would bias the associated ratchet member 165 into the associated slot 167 to effect a driving connection between the parts 153 and 151. It is also to be understood that the gear member 113 can be merely turned over to reverse the driving and slipping directions of the relatively movable parts. The following description of the operative connections between the shaft 48 and handle 18 with the center gear 30 is given with the direction of rotation considered looking down in the direction of the arrows X—X in FIG. 5. Referring to FIG. 5, if the shaft 48 is rotated in a counterclockwise direction, the center part 135 of the one-way gear member 111 will be rotated with the shaft 48 to drive the outer part 137 of the gear 111 in a counterclockwise direction. Because of the engagement of the teeth of the outer part 137 of the gear 111 in the opening 163 (FIG. 6) of the gear 30, counterclockwise rotation of the outer part 137 of the gear 111 will rotate the center gear 30 in a counterclockwise direction thereby operatively driving the gear 30. During this movement, the outer part 153 of the gear 113 will be moved in a counterclockwise direction because of the engagement of the teeth of the outer part 153 in the opening 163 (FIG. 6) of the gear member 30. With the outer part 153 of the gear 113 moving in a counterclockwise direction, the gear will slip and the inner part 151 thereof will remain stationary so that the handle 18 which is secured to the inner part 151 will remain stationary. Thus, the driving connection between the shaft 48 and gear member 30 is effected without effecting rotation of the handle 18.

Referring to FIG. 5, it can be understood that if the handle 18 is rotated in a counterclockwise direction the connector 141 will be rotated counterclockwise to rotate the center part 135 of the one-way gear member 111 in a counterclockwise direction. Counterclockwise rotation of the center part 135 of the gear 111 will operate through the ratchet members 165 (FIG. 7) to rotate the outer part 137 in a counterclockwise direction to thereby rotate the gear member 30 in a counterclockwise direction. Counterclockwise rotation of the gear member 30 will operate to rotate the outer part 137 of the gear 111 in a counterclockwise direction and the gear 111 will slip so that the inner part 135 and shaft 48 will remain stationary.

It can be understood that with the particular connection described in FIGS. 5–8, the subject transfer switch can be manually operated freely without rotating the shaft 48 so that an operator can operate the switch without having to forcefully overcome the drag of the motor parts. It can also be understood that if the motor is energized to operate the subject transfer switch while the handle 18 is being manually operated, the motor can drive the center gear 30 independent of the handle 18. Thus, this design provides safety to an individual who may be in the process of manually operating the switch when the operating motor becomes energized. Thus there is provided what is in effect a connection wherein the handle is trip-free of operation of the motor of the transfer switch. The gears 111 and 113 are constructed such that there is a smooth relative rotation of one part relative to the other during a slipping or non-driving operation. The ratchet function is so constructed that the positive driving connection is quickly effected during the driving operations. As was previously described, the direction of the operation of the gears 111 and 113 can be readily reversed by merely turning these members over or by constructing them such that the notches and ratchet members are so shaped as to reverse the driving and slipping functions of the two relatively movable members.

Since numerous changes may be made in the above-described construction and because different embodiments of the invention may be made without departing from the spirit and scope of the invention, it is intended that all the matter contained in the foregoing description or shown in the accompanying drawings shall be interpreted as illustrative and not in a limiting sense.

We claim as our invention:

1. In combination, a pair of circuit interrupters, means supporting said circuit interrupters in a spaced relationship, each of said circuit interrupters comprising a pair of contacts and an operating member reciprocal between operating positions to open and close the associated contacts, a mechanism for operating said circuit interrupters, said mechanism comprising a unidirectional motor, an actuator for each of said circuit interrupters, means supporting each of said actuators for reciprocal movement, means connecting each of said actuators to the associated operating member whereby reciprocation of the actuator will operatively reciprocate the associated operating member, and means connecting said actuators with said motor whereby unidirectional operation of said motor will operatively reciprocate both said actuators.

2. In combination, two circuit interrupters, means supporting said circuit interrupters in a spaced relationship, each of said circuit interrupters comprising a pair of contacts and an operating member movable between operating positions to open and close the contacts, a mechanism for operating said circuit interrupters, said mechanism comprising an operating gear, a motor structure, means operatively connecting said motor structure with said operating gear, a separate actuating gear for each of said circuit interrupters, means operatively connecting each of said separate actuating gears with said operating gear, means operatively connecting each of said operating members with a different one of said separate actuating gears, and upon operation of said motor said operating gear operating said actuating gears to operate said pair of circuit interrupters.

3. In combination, two circuit interrupters, means supporting said circuit interrupters in a spaced relationship, each of said circuit interrupters comprising a pair of contacts and an operating member movable between operating positions to open and close the contacts, a mechanism for operating said circuit interrupters, said mechanism comprising an operating gear, a motor structure, means operatively connecting said motor structure with said operating gear, a separate actuating gear for each of said circuit interrupters, means operatively connecting each of said separate actuating gears with said operating gear, means operatively connected each of said operating members with a different one of said separate actuating gears, and upon operation of said motor said operating gear operating said actuating gears to operate said pair of circuit interrupters, a handle structure, and means operatively connecting said handle structure with said operating gear to permit manual operation of said circuit interrupters.

4. In combination, two circuit interrupters, each of said circuit interrupters comprising a pair of contacts and an operating member operable between operating positions to open and close the contacts, a mechanism for operating said circuit interrupters and supported in proximity to said circuit interrupters, said mechanism comprising a motor structure, an operating gear operatively connected to said motor structure, a separate actuating gear operatively connected to said operating gear and operatively connected to a different one of each of said two circuit interrupter operating members, each of said operating connections between the actuating gear and the associated operating member comprising cam means, said motor being operable to operate said operating gear to thereby operate said actuating gears to operate said cam means to operate said operating members to thereby operate said circuit interrupters, and said cam means being constructed such that during the said operation of said circuit interrupters there will be an instantaneous condition when both of said circuit interrupters are in the open position.

5. A mechanism for operating a circuit interrupter, said mechanism comprising a controllable unidirectionally rotating electrical motor, at least one rotatable member operatively connected to be driven by said motor, a first cam part connected to said rotatable member and moved around a generally circular path upon rotation of said rotatable member, a slide member supported to move in an essentially linear path, a second cam part operated by said slide member and cooperable with said first cam part, one of said cam parts comprising a cam surface and the other of said cam parts comprising a cam follower, the length of said cam surface being at least equal to the diameter of said circular path, said first and second cam parts cooperating to effect reciprocal movement of said slide member upon rotation of said rotatable member, and means for connecting said slide to the operating handle of a circuit interrupter.

6. An operating mechanism for operating a pair of spaced circuit interrupters, said operating mechanism comprising a unidirectional electric motor, a pair of rotatable members operatively connected to be rotated upon operation of said motor, a separate first cam part on each of said rotatable members each of which first cam parts is moved around a generally circular path when the associated rotatable member is rotated by said operation of said motor, a separate slide supported adjacent each of said rotatable members and supported to reciprocate in an essentially linear path, a separate second cam part on each of said slide members engaged by a different one of said first cam parts, each of said second cam parts cooperating with the associated engaged first cam part to form a pair of cam parts, in each of said pairs one of said cam parts comprising a cam follower and the other of said cam parts comprising a cam surface, the length of each of said cam surfaces being at least equal to the diameter of the generally circular path of the associated cam follower, and each of said slides being connectable to the operating handle of a circuit interrupter.

7. An operating mechanism for operating a pair of spaced circuit interrupters, said operating mechanism comprising a unidirectional motor, a pair of rotatable members operatively connected to be rotated upon operation of said motor, a cam follower on each of said rotatable members each of which cam followers is moved around a generally circular path when the associated rotatable member is rotated by said operation of said motor, a separate slide supported adjacent each of said rotatable members and supported to reciprocate in an essentially linear path, a cam surface on each of said slide members engaged by the associated cam follower, the length of each of said cam surfaces being at least equal to the diameter of the generally circular path of the associated cam follower, means on each of said slide to enable connection of said slide to the operating handle of a circuit interrupter, and said pair of cam followers being 180° out of phase in position in their respective circular paths.

8. In combination, two circuit interrupters, each of said circuit interrupters comprising a pair of contacts and an operating member reciprocal between two positions to open and close the contacts, an operating assembly for operating said circuit interrupters and supported in proximity to said circuit interrupters, said operating assembly comprising a unidirectional motor structure, a rotating shaft, said motor being operable to rotate said shaft, an operating gear operatively connected to said shaft, two separate actuating gears each operatively connected to said operating gear, a separate generally rectilinearly movable member supported to cooperate with each of said actuating gears and each supported for generally rectilinear reciprocal movement, means connecting each of said rectilinearly movable members with a different one of said operating members, separate cam means connecting each of said actuating gears with the associated rectilinearly movable member, upon the occurrence of a first automatic operation said motor structure rotating said shaft in a first direction to rotate said operating gear which movement operates through said actuating gears, said separate cam means, said rectilinearly movable members and said operating members to operate the contacts of a first of said circuit interrupters to the open position and to operate the contacts of the second of said circuit interrupters to the closed position, upon the occurrence of a subsequent automatic operation said motor structure rotating said shaft in said first direction to rotate said operating gear which movement operates through said actuating gears, said separate cam means, said rectilinearly movable members and said operating members to operate the contacts of said first circuit interrupter to the closed position and to operate the contacts of said second circuit interrupter to the open position, and during each of said automatic operations the circuit interrupter with the closed contacts being first opened and thereafter the circuit interrupter with the opened contacts being closed.

9. In combination, a circuit interrupter, said circuit interrupter comprising a pair of contacts and an operating member movable between operating positions to open and close said contacts, an operating structure rotatable to operate said operating member, motor means comprising a motor driven rotatable shaft, comprising means operatively connecting said shaft to said operating structure, a handle structure, said connecting means comprising means operatively connecting said handle structure to said operating structure, said means connecting said shaft to said operating structure comprising a one-way driving connection whereby rotation of said shaft in a first direction will rotate said operating structure to operate said operating member independent of said handle structure, and said means connecting said handle structure to said operating structure comprising a one-way driving connection whereby rotation of said handle in said first direction will rotate said operating structure to operate said operating member independent of said shaft.

10. In combination, a circuit interrupter, said circuit interrupter comprising a pair of cooperable contacts and an operating member movable between operating positions to open and close the contacts, an operating assembly supported in proximity to said circuit interrupter and comprising a gear member, means operatively connecting said gear member with said operating member, a motor structure, means comprising a first one-way drive gear providing a one-way driving connection between said motor structure and said gear member, a handle structure, and means comprising a second one-way drive gear providing a one-way driving connection between said handle structure and said gear member.

11. In combination, a circuit interrupter, said circuit interrupter comprising a pair of contacts and an operating member movable between operating positions to open and close the contacts, a rotatable operator, means operatively connecting said rotatable operator to said operating member, a motor structure comprising a rotatable shaft, means operatively connecting said rotatable shaft with said rotatable operator, a handle structure, a one-way driving connection between said handle structure and said rotatable operator, when said handle structure is rotated in a first direction said one-way connection driving said rotatable operator to move said operating member from one to the other of said positions, when said rotatable operator is rotated in said one direction by operation of said motor said one-way connection slipping to permit said rotatable operator to be rotated independent of said handle structure.

12. In combination, a circuit interrupter, said circuit interrupter comprising a pair of contacts and an operating member movable between operating positions to open and close the contacts, a rotatable operator, means operatively connecting said rotatable operator with said operating member, a motor structure comprising a rotatable shaft, means operatively connecting said rotatable shaft with said rotatable operator, a handle structure, means operatively connecting said handle structure with said rotatable operator, the connection between said rotatable shaft and said rotatable operator comprising a one-way gear providing a one-way driving connection between said shaft and said rotatable operator whereby when said shaft is rotated in a first direction said one-way gear drives said rotatable operator to move said operating member from one to the other of said positions and when said rotatable operator is rotated in said one direction by operation of said handle structure said one-way gear slip to permit said rotatable operator to be rotated independent of said shaft.

13. In combination, a circuit interrupter, said circuit interrupter comprising a pair of contacts and an operating member movable between operating positions to open and close the contacts, a rotatable operator, means operatively connecting said rotatable operator with said operating member, a motor structure disposed on one side of said rotatable operator and comprising a motor and a rotataing shaft, a first one-way driving connection between said rotating shaft and said rotatable operator, a handle structure disposed on the side of said rotatable operator that is opposite said first side, a second one-way driving connection between said handle structure and said rotatable operator, when said shaft is rotated in a first direction by operation of said motor said shaft operating through said first one-way connection to rotate said rotatable operator in said first direction, when said rotatable operator is rotated in said first direction by operation of said handle structure said first one-way connection slipping to permit rotation of said rotatable operator independent of said shaft, when said handle structure is rotated in said first direction said second one-way connection being rotated to rotate said rotatable operator in said first direction, when said rotatable operator is rotated in said first direction by operation of said shaft said second one-way connection slipping to permit rotation of said rotatable operator independent of said handle structure.

14. In combination, a circuit interrupter, said circuit interrupter comprising a pair of contacts and an operating member movable between operating positions to open and close the contacts, a rotatable operator, means operatively connecting said rotatable operator with said operating member, a motor structure comprising a unidirectional motor and a rotating operating shaft, a handle structure comprising a manually operable handle, connecting means connecting said operating shaft and said handle structure with said rotatable operator, said connecting means comprising a first one-way drive and a second one-way drive, upon rotation of said shaft in a first direction said first one-way drive being driven by rotation of said shaft to drive said rotatable operator to effect operation of said contacts from one to the other of said positions during which movement said second one-way drive slips to permit said rotatable operator to be rotated independent of said handle structure, upon rotation of said handle structure in said first direction said second one-way drive being driven by said rotation to drive said rotatable operator in said first direction to effect operation of said contacts from one to the other of said positions during which movement said first one-way drive slips to permit said rotatable operator to be rototed independent of said shaft and motor structure.

15. In combination, a circuit interrupter, said circuit interrupter comprising a pair of contacts and an operating member movable between operating positions to open and close the contacts, a rotatable operator, means operatively connecting said rotatable operator with said operating member, a motor structure comprising a unidirectional motor and a rotating operating shaft and being disposed on a first side of said rotatable operator, a handle structure disposed on the side of said rotatable operator that is opposite said first side and comprising a manually operable handle, said rotatable operator having opening means in proximity to the axis of rotation thereof, a connecting assembly supported at said opening means of said rotatable operator, said connecting assembly connecting said operating shaft and said handle structure with said rotatable operator, said connecting assembly comprising a first one-way gear and a second one-way gear, upon rotation of said shaft in a first direction said first one-way gear being driven by rotation of said shaft to drive said rotatable operator to effect operation of the contacts of both of said circuit interrupters during which movement said second one-way gear slips to permit said rotatable operator to be rotated independent of said handle structure, upon rotation of said handle structure in said first direction said second one-way gear being driven by said rotation of said handle structure to drive said rotatable operator in said first direction to effect operation of the contacts of both of said circuit interrupters during which movement said first one-way gear slips to permit said rotatable operator to be rotated independent of said shaft and motor structure.

16. In combination, two circuit interrupters, means supporting said circuit interrupters in spaced relationship, each of said circuit interrupters comprising a pair of cooperable contacts and an operating member movable between two positions to open and close the contacts, a motor operating mechanism comprising a motor, connecting means comprising a first one-way driving connection between said motor and said operating members, said connecting means comprising a second one-way driving connection between said handle structure and said operating members, whereby said motor is operable to operate said operating members independent of said handle structure and said handle structure is operable to operate said operating members independent of said motor.

17. In combination, two circuit interrupters, means supporting said circuit interrupters in a spaced relationship, each of said circuit interrupters comprising a pair of cooperable contacts and an operating member movable between operating positions to open and close the contacts, an operating assembly supported in proximity to said circuit interrupters and comprising an operating gear member, a separate actuating gear for each of said circuit interrupters and operatively connected to said operating gear, means operatively connecting each of said actuating gears with a different one of said operating members, a motor structure, means comprising a first one-way drive gear providing a one-way driving connection between said motor structure and said operating gear, a handle structure, and means comprising a second-way drive gear providing a one-way driving connection between said handle structure and said operating gear.

18. In combination, two circuit interrupters, each of said circuit interrupters comprising a pair of contacts and an operating member movable between operating positions to open and close the contacts, means supporting said circuit interrupters in a spaced relationship, an operating mechanism supported in proximity to said circuit interrupters and comprising a rotatable operator, means operatively connecting said rotatable operator to said two operating members, a motor structure comprising a rotatable shaft, means operatively connecting said rotatable shaft with said rotatable operator, a handle structure, a one-way driving connection between said handle structure and said rotatable operator, when said handle structure is rotated in a first direction said one-way connection driving said rotatable operator to move said operating members to operatively move the contacts of both of said circuit interrupters, when said rotatable operator is rotated in said one direction by operation of said motor to operatively move the contacts of both of said circuit interrupters, said one-way connection slipping to permit said rotatable operator to be rotated independent of said handle structure.

19. In combination, two circuit interrupters, each of said circuit interrupters comprising a pair of contacts and an operating member movable between operating positions to open and close the contacts, means supporting said circuit interrupters in a spaced relationship, an operating mechanism supported in proximity to said circuit interrupters and comprising a rotatable operator, means operatively connecting said rotatable operator to said two operating members, a motor structure comprising a rotatable shaft, means operatively connecting said rotatable shaft with said rotatable operator, a handle structure, means operatively connecting said handle structure with said rotatable operator, the connection between said shaft and said rotatable operator comprising a one-way driving connection between said shaft and said rotatable operator whereby when said shaft is rotated in a first direction said one-way connection will drive said rotatable operator to move said operating members to operatively move the contacts of both of said circuit interrupters and when said rotatable operator is rotated in said one direction by operation of said handle structure to operatively move the contacts of both of said circuit interrupters said one-way connection slips to permit said rotatable operator to be rotated independent of said shaft.

20. In combination, two circuit interrupters, each of said circuit interrupters comprising a pair of contacts and an operating member movable between operating positions to open and close the contacts, means supporting said circuit interrupters in a spaced relationship, an operating mechanism supported in proximity to said circuit interrupters and comprising a rotatable operator, means operatively connecting said rotatable operator with said two operating members, a motor structure disposed on one side of said rotatable operator and comprising a motor and a rotating operating shaft, a first one-way driving connection between said rotating shaft and said rotatable operator, a handle structure disposed on the side of said rotatable operator that is opposite said first side, a second one-way driving connection between said handle structure and said rotatable operator, when said shaft is rotated in a first direction by operation of said motor, said shaft operating through said first one-way connection to rotate said rotatable operator in said first direction, when said rotatable operator is rotated in said first direction by operation of said handle structure said first one-way connection slipping to permit rotation of said rotatable operator independent of said shaft, when said handle structure is rotated in said first direction said second one-way connection being rotated to rotate said rotatable operator in said first direction, when said rotatable operator is rotated in said first direction by operation of said shaft said second one-way connection slipping to permit rotation of said rotatable operator independent of said handle structure.

21. In combination, two circuit interrupters, each of said circuit interrupters comprising a pair of contacts and an operating member movable between operating positions to open and close the contacts, means supporting said circuit interrupters in a spaced relationship, a transfer mechanism assembly supported in proximity to said circuit interrupters and comprising a rotatable operating gear, a separate rotatable actuating gear for each of said circuit interrupters and operatively connected to said operating gear, a separate rectilinearly movable member supported for rectilinear movement in proximity to each of said operating members, cam means operatively connecting each of said actuating gears with the associated rectilinearly movable member to operatively rectilinearly move the rectilinearly movable member upon rotation of the associated actuating gear, means operatively connecting each of said rectilinearly movable members with the associated operating member to operatively move the operating member upon operative rectilinear movement of the rectilinearly movable member, a motor structure comprising a unidirectional motor and a rotating operating shaft and being disposed on a first side of said operating gear, a handle structure disposed on the side of said operating gear that is opposite said first side and comprising a manually operable handle, said operating gear having opening means in proximity to the axis of rotation thereof, a connecting assembly supported at said opening means of said rotatable operator, said connecting assembly connecting said operating shaft and said handle structure with said operating gear, said connecting assembly comprising a first one-way gear and a second one-way gear, upon rotation of said shaft in a first direction said first one-way gear being driven by rotation of said shaft to drive said operating gear to effect operation of the contacts of both of said circuit interrupters during which movement said second one-way gear slips to permit said operating gear to be rotated independent of said handle structure, upon rotation of said handle structure in said first direction said second one-way gear being driven by said rotation of said handle structure to drive said operating gear in said first direction to effect operation of the contacts of both of said circuit interrupters during which movement said first one-way gear slips to permit said operating gear to be rotated independent of said shaft and motor structure.

22. In combination, a pair of circuit interrupters, each of said circuit interrupters comprising a stationary contact and a movable contact, each of said circuit interrupters comprising an operating member and an overcenter spring means operatively connecting the operating member to the associated movable contact, each of said operating members being movable from a first position to a second position to operate the associated overcenter spring means to thereby operate the associated movable contact into a closed position in engagement with the associated stationary contact, each of said operating members being movable from the said second position to the said first position to operate the associated overcenter spring means to thereby operate the associated movable contact to an open position out of engagement with the associated stationary contact, a mechanism for operating said pair of circuit interrupters, said mechanism comprising an electric unidirectional motor, connecting means connecting said unidirectional motor with both of said operating members of said pair of circuit interrupters, upon a first rotating operation of said unidirectional motor said connecting means being operated to operate one of said operating members from the first to the second position and the other of said operating members from the second to the first position, and upon another rotating operation of said unidirectional motor in the same direction said connecting means being operated to operate said one operating member from the second position to the first position and said other operating member from the first position to the second position, and means providing that during each of said operations of said motor the movable contact of the circuit interrupter that is going to the open position will be operated to the open position before the movable contact of the circuit interrupter that is going to the closed position reaches the closed position.

23. In combination, a circuit interrupter comprising a stationary contact, a movable contact, an operating member operatively connected to said movable contact and being movable between operating positions to open and close said contacts, an operating assembly comprising a motor, a one-way ratchet-type driving connection between said motor and said operating member, upon an initial operation of said motor said one-way ratchet-type driving connection operating said operating member to open said contacts and upon a continued operation of said motor said one-way ratchet-type driving connection operating said operating member to close said contacts, and said one-way ratchet-type driving connection permitting said operating member to be operated independent of said motor.

24. In combination, a circuit interrupter comprising a stationary contact, a movable contact, an operating member operatively connected to said movable contact and movable between operating positions to open and close said contacts, a handle structure, a one-way ratchet-type driving connection between said handle structure and said operating member, said handle structure being movable from a first position to a second position to operate said one-way ratchet-type driving connection to thereby operate said operating member to open said contacts, said handle structure being movable from said second position to said first position to operate said one-way ratchet-type driving connection to operate said operating member to close said contacts, and said one-way ratchet-type driving connection permitting said operating member to be operated from said first position to said second position and also from said second position to said first position independent of said handle structure.

25. In combination, a circuit interrupter, said circuit interrupter comprising a stationary contact, a movable contact, an operating member operatively connected to said movable contact, said operating member being movable from a first position to a second position to open said contacts, said operating member being movable from said second position to said first position to close said contacts, an operating assembly comprising a motor and a handle structure, connecting means connecting said motor and said handle structure to said operating member, upon an initial operation of said motor said motor operating said connecting means independent of said handle structure to operate said operating member from said first position to said second position, upon a subsequent operation of said motor said motor operating said connecting means independent of said handle structure to operate said operating member from said second position to said first position, upon a first handle operation of said handle structure said handle structure operating said connecting means independent of said motor to operate said operating member from said first position to said second position, and upon a subsequent handle operation of said handle structure said handle structure operating said connecting means independent of said motor to operate said operating member from said second position to said first position.

References Cited by the Examiner

UNITED STATES PATENTS 2,626,326 1/1953 Baston et al. ---------- 200—18
2,788,416 4/1957 Kilbury ----------- 200—18 X
2,861,198 11/1958 Soos ---------------- 307—64

2,943,161 6/1960 Fath ------------- 200—153 X
3,089,926 5/1963 Everard et al. --------- 200—38

References Cited by the Applicant

UNITED STATES PATENTS 1,760,532 5/1930 Walle.
1,803,653 5/1931 Rah.
2,025,653 12/1935 Dyer.
2,192,046 2/1940 Lindstrom.
2,376,506 5/1945 Robbins.
3,069,518 12/1962 Soos.

ROBERT K. SCHAEFER, *Primary Examiner.*

KATHLEEN H. CLAFFY, *Examiner.*

J. R. SCOTT, *Assistant Examiner.*